(12) United States Patent
Pais

(10) Patent No.: US 7,080,504 B2
(45) Date of Patent: Jul. 25, 2006

(54) LASER AUGMENTED TURBOJET PROPULSION SYSTEM

(75) Inventor: Salvatore Pais, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 12 days.

(21) Appl. No.: 10/897,699

(22) Filed: Jul. 23, 2004

(65) Prior Publication Data

US 2006/0016169 A1    Jan. 26, 2006

(51) Int. Cl.
 *F03H 1/00* (2006.01)
 *G21D 1/00* (2006.01)
 *H05B 1/00* (2006.01)

(52) U.S. Cl. ............... 60/203.1; 60/39.821; 60/247

(58) Field of Classification Search ........... 60/203.1, 60/804, 39.821, 247, 39.38, 39.76
See application file for complete search history.

(56) References Cited

U.S. PATENT DOCUMENTS

| | | | | |
|---|---|---|---|---|
| 4,036,012 A | | 7/1977 | Monsler | 60/203 |
| 4,302,933 A | * | 12/1981 | Smith | 60/761 |
| 5,152,135 A | | 10/1992 | Kare | 60/203.1 |
| 5,367,869 A | * | 11/1994 | DeFreitas | 60/776 |
| 5,404,712 A | * | 4/1995 | Few et al. | 60/39.821 |
| 5,485,720 A | * | 1/1996 | Few et al. | 60/39.821 |
| 5,497,612 A | * | 3/1996 | Few et al. | 60/776 |
| 5,515,681 A | * | 5/1996 | DeFreitas | 60/740 |
| 5,542,247 A | * | 8/1996 | Bushman | 60/203.1 |
| 5,588,299 A | * | 12/1996 | DeFreitas | 60/740 |
| 5,590,517 A | * | 1/1997 | DeFreitas | 60/776 |
| 5,598,699 A | * | 2/1997 | Few et al. | 60/39.821 |
| 5,615,548 A | * | 4/1997 | Winfree et al. | 60/39.78 |
| 5,628,180 A | * | 5/1997 | DeFreitas | 60/776 |
| 5,845,480 A | * | 12/1998 | DeFreitas et al. | 60/776 |
| 6,349,538 B1 | * | 2/2002 | Hunter et al. | 60/204 |
| 6,385,963 B1 | * | 5/2002 | Hunt et al. | 60/203.1 |
| 6,439,503 B1 | * | 8/2002 | Winfree et al. | 244/53 R |
| 6,459,205 B1 | | 10/2002 | Schall et al. | 315/111.21 |
| 6,488,233 B1 | | 12/2002 | Myrabo | 244/62 |
| 6,584,761 B1 | * | 7/2003 | Hunter, Jr. | 60/204 |
| 2003/0029161 A1 | * | 2/2003 | Hunter, Jr. | 60/211 |
| 2004/0123582 A1 | * | 7/2004 | Norris et al. | 60/39.38 |
| 2004/0123583 A1 | * | 7/2004 | Nordeen et al. | 60/226.1 |
| 2004/0261396 A1 | * | 12/2004 | Sammann et al. | 60/226.1 |
| 2005/0000205 A1 | * | 1/2005 | Sammann et al. | 60/226.1 |

* cited by examiner

*Primary Examiner*—William Rodriguez
(74) *Attorney, Agent, or Firm*—Louis L. Dachs

(57) ABSTRACT

The invention is a turbojet propulsion system which includes a compressor section, a turbine section coupled by a shaft to the compressor section, a combustion section mounted between the compressor section and the turbine section, and an exhaust duct coupled to the aft end of said turbine section. A fuel delivery system is incorporated for supplying fuel to the combustion section. A laser assembly provides electromagnetic radiation to the combustion section. An electrical generator coupled to the turbine driven shaft powers the laser assembly.

9 Claims, 3 Drawing Sheets

LASER AUGMENTED TURBOJET PROPULSION SYSTEM

BACKGROUND OF THE INVENTION

1. Field of the Invention

The invention relates to the field of propulsion systems and, in particular, to a turbojet propulsion system wherein lasers are used to add additional energy to the combustion process.

2. Description of Related Art

Recent Defense Advanced Research Projects Agency (DARPA) advances in the field of Diode Pumped Solid State Laser Technology, specifically Fiber Lasers, have enabled scalable and robust system packaging architectures for operation in harsh environments. These next generation fiber laser systems require minimal thermal management and possess a relatively small footprint within an integrated assembly. The combination of a laser diode pump and an optical fiber gain medium makes possible extremely compact packages suitable for a diversity of applications. State of the art solid-state laser technology comprises three principal components, namely the lasing material (active medium), the optical pump source, and the optical cavity (resonator). The lasing material can be Ytterbium-Yttrium Aluminum Garnet (Yb-YAIG) crystal, or Yfterbium/Erbium-Ytterbium doped optical fiber. The optical pump source (flash lamp, laser diode or fiber laser) adds energy to the lasing material to cause electron collisions, and hence radiation from a laser, by principle of population inversion.

Transmitting laser energy from some platform (ground, airborne, or orbiting) through an optical window to heat a working fluid, has been investigated either theoretically or experimentally by NASA among other organizations. Examples of these types of propulsion systems can be found in U.S. Pat. No. 4,036,012, Laser Powered Rocket Engine Using A Gas Dynamic Window by M. L, Monsler; U.S. Pat. No. 6,459,205, Propulsion System And Method Of Generating Shockwaves by W. Schall, et al.; U.S. Pat. No. 6,488,233, Laser Propelled Vehicle by L. N Myrabo and U.S. Pat. No. 5,152,135, Reflector For Efficient Coupling Of A Laser Beam To Air Or Other Fluids by J. T. K. Because they all utilize external (not on-board) laser systems to generate gas dynamic propulsion, they have limited use and application.

U.S. Pat. No. 6,385,963, Optical System For Generating Endothermic Fuel For Use In A Propulsion System By J. H. Hunt, et al discloses a rocket engine wherein fuel and oxidizer are injected into a thrust chamber and ignited. A laser system is used to heat the fuel to a temperature wherein it dissociates prior to injection into the combustion chamber, thus increasing the energy available to produce thrust. U.S. Pat. No. 5,542,247, Apparatus Powered Using Laser Supplied Energy by B. B. Bushman discloses both rocket engine and turbojet engine concepts wherein the laser is used within the combustion chamber for disassociation of the air molecules, producing pressure waves, consequently providing thrust. However, this latter concept does not address the power required to actuate the laser.

Thus, it is a primary object of the invention to provide a propulsion system wherein lasers are used to provide increased thermal activity in the combustion chamber, thereby causing enhanced combustion and consequently augmenting thrust or power output.

It is another primary object of the invention to provide a turbojet propulsion system wherein lasers are used to provide increased thermal activity in the combustion chamber.

It is a further object of the invention to provide a propulsion system wherein lasers are used to provide increased thermal activity in the combustion chamber wherein the propulsion system provides the power for the laser.

SUMMARY OF THE INVENTION

The invention is a turbojet propulsion system incorporating lasers to augment the combustion process. In detail, the propulsion system includes a compressor section, a turbine section coupled by a shaft to the compressor section, a combustion section mounted between the compressor section and the turbine section, and an exhaust duct (nozzle) coupled to the aft end of the turbine section. A fuel delivery system is included for supplying fuel to the combustion section. A laser assembly powered by an electrical generator driven of the shaft is used to provide intense electromagnetic radiation to the combustion section.

The laser system includes a plurality of lasers coupled to the combustion section both circumferentially and along the longitudinal axis thereof. In one embodiment, the combustion section is in the shape of a hollow cylindrical ring having external and internal circumferential walls, the internal surfaces of the external and internal walls having laser beam reflecting surfaces. Preferably these internal surfaces are coated with high temperature resistant optical substrates such as Silicon Dioxide and Aluminum Oxide. The lasers of the laser assembly are positioned on the external wall to direct laser beams to the internal surface of the internal wall, such that the laser beams are reflected off the internal surface of the internal wall back toward the internal surface of the external wall. Preferably, the lasers are directed slightly off the longitudinal axis such that the laser beams reflected off the internal surface of the inner wall are not reflected directly back into the output optics of the laser which initiates the beam.

In a second embodiment, the turbojet propulsion system includes a combustion section that includes a plurality of hollow cylinders formed into a ring, each having a centrally located longitudinal axis. The inner surface of the cylinders include a laser beam reflecting surface. The lasers are positioned on the external surfaces of each of the cylinders to direct laser beams into the cylinders such that the laser beams are reflected off the inner surface of the cylinder. Preferably the lasers are positioned on the external surface of the cylinders such that the laser beams do not pass through the longitudinal axis of the cylinders. The Fiber laser output ends can act as one way mirrors, in that light may pass through into the combustion cylinders, however reflected laser light may not be allowed back, so as to prevent damage to the laser beam output optics.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

DESCRIPTION OF THE PREFERRED EMBODIMENT

Figure 1:
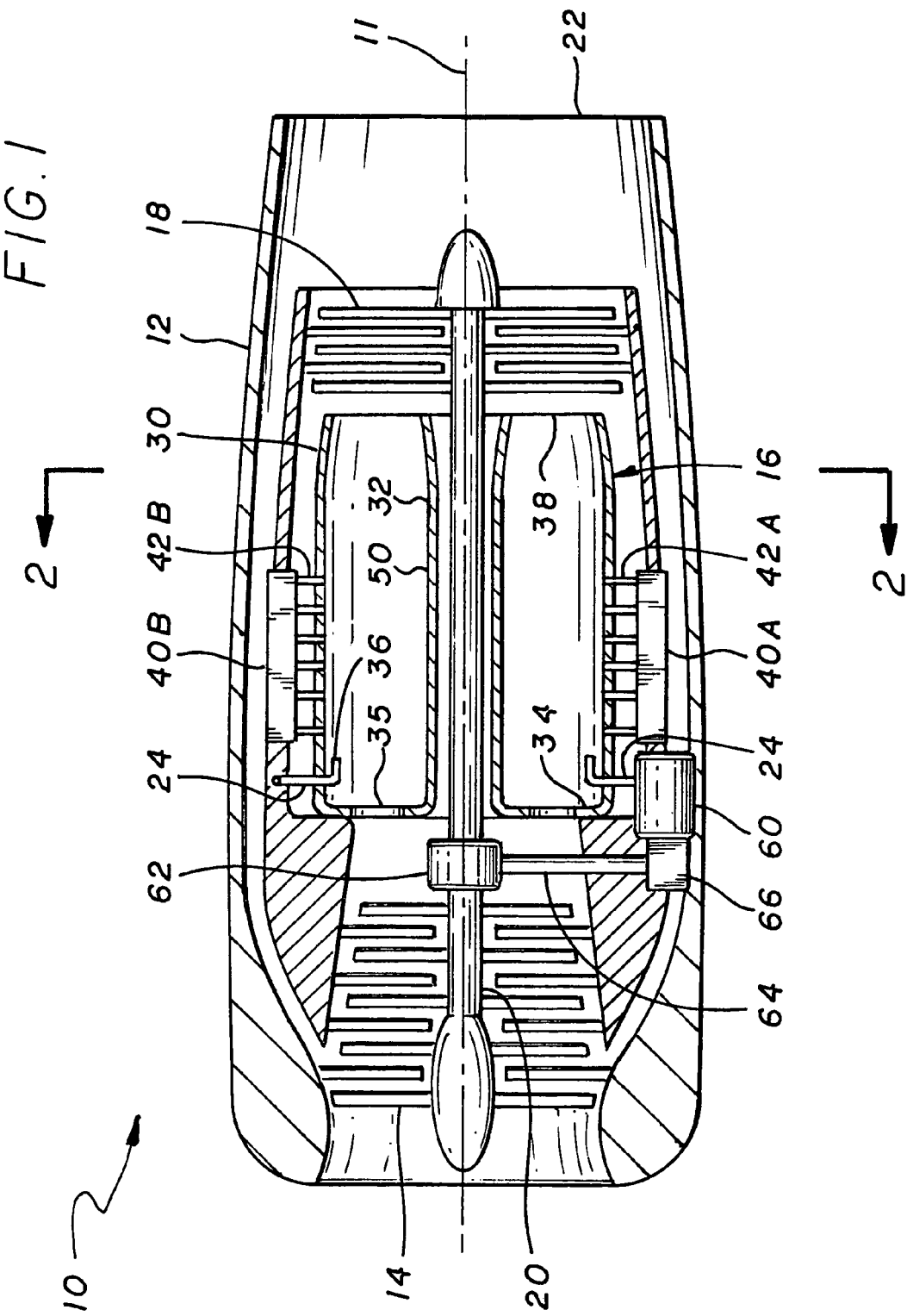
FIG. 1 is a simplified schematic representation of a turbojet engine having a single annular shaped combustion chamber.

Referring to FIG. 1, the typical turbojet engine, generally indicated by numeral 10, having a longitudinal axis 11, The turbojet engine 10 includes a housing 12, compressor section 14 combustion section 16, turbine section 18 coupled by drive shaft 20 to the compressor, and an exhaust nozzle 22. Fuel is provided to the combustion section 16 by means a fuel system that includes fuel lines 24 coupled to a fuel pump (not shown). Air enters the compressor section 14, is compressed thereby; enters the combustion section where fuel is added and ignited and the hot gases pass through the turbine section 18 wherein energy is extracted to power the compressor section and thereafter exits out the exhaust nozzle 22. The combustion section 16 is ring shaped cylinder having an outer wall 30 and inner wall 32, a closed off front end 34 with compressed air inlet ports 35 and fuel injectors 36 and a nozzle end 38 for directing hot gas to the turbine section 18. While the above description is simplified, it is basic to all turbojet and turbo-shaft engines.

Figure 2:
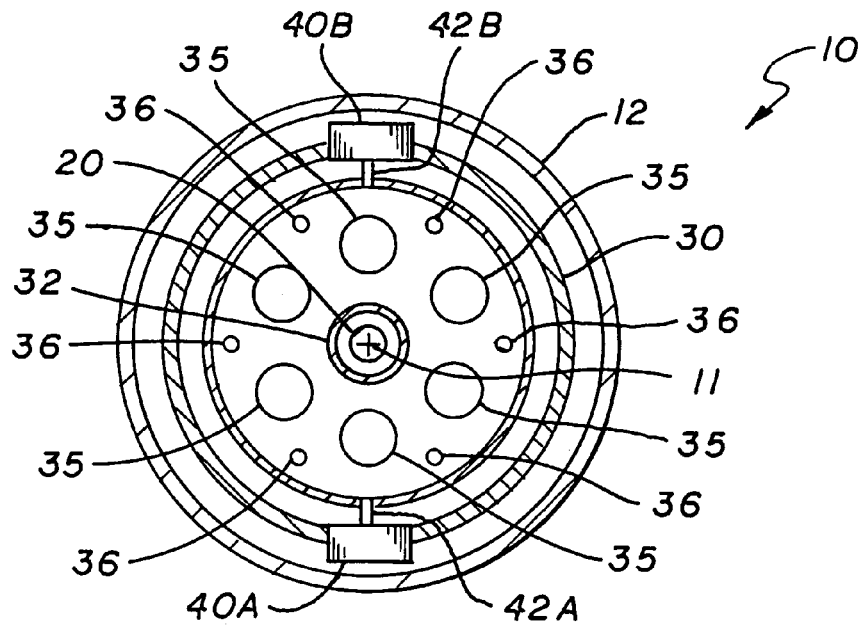
FIG. 2 is an enlarged cross-sectional view of the turbojet engine shown in FIG. 1 taken along the line 2—2.
Figure 4:
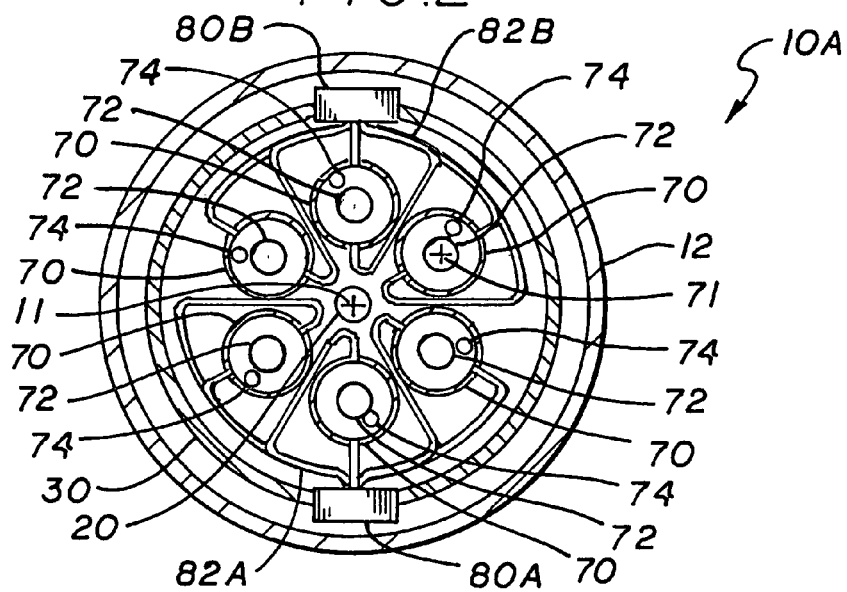
FIG. 4 is an enlarged cross-sectional view of the turbojet engine shown in FIG. 3 taken along the line 4—4.
Figure 5:
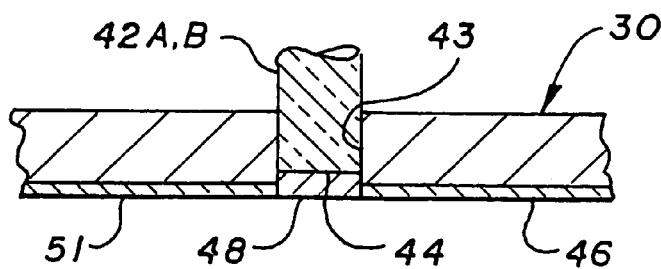
FIG. 5 is a partial cross-sectional view of the combustion chamber shown in FIG. 1 illustrating the attachment of the fiber optic laser thereto.
Figure 3:
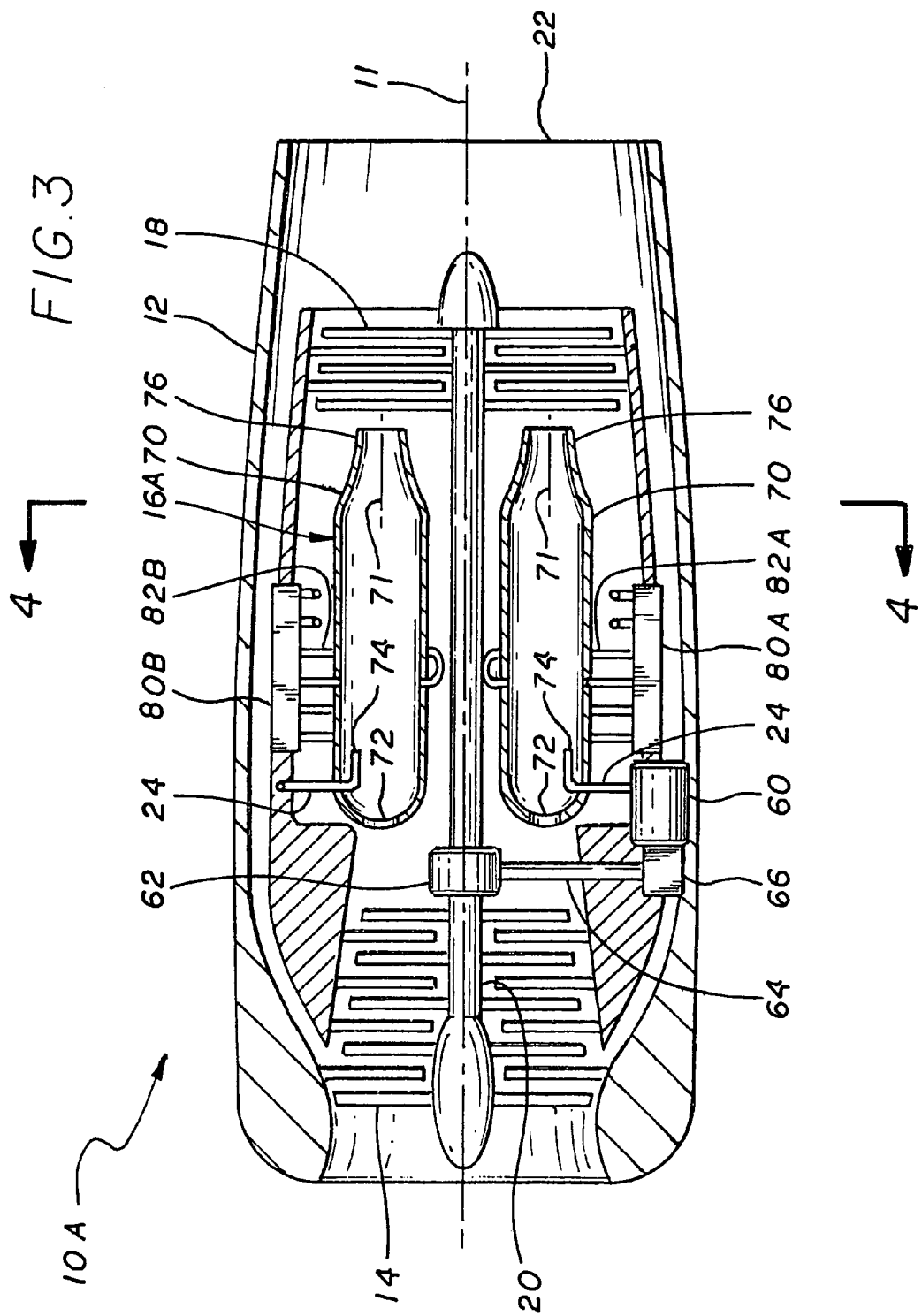
FIG. 3 is a simplified schematic representation of a turbojet engine having a plurality of annular shaped combustion chambers mounted about the longitudinal axis thereof.

As discussed in the prior art, a laser beam at the right frequency and power can disassociate air molecules as well as those of the fuel. Thus still referring to FIG. 1 and additionally to FIGS. 2 and 5, laser assemblies 40A and 40B are positioned about the circumference of the outer wall 30 of the ring shaped combustion section 16 in rows along the longitudinal axis 11 and fiber optic cables 42A and 42B connect the laser arrays thereto. These fiber optic lasers can be obtained from Southampton Photonics, Southampton, in the United Kingdom, Spectra-Physics Corporation, Mountain View, Calif., or Aculight Corporation, Bothell, Wash. Referring to particularly to FIG. 5, each fiber optic cables 42A and 42B are coupled via holes 43 to the outer wall 30 of the combustion section 16, such that the end 44 of the cable is almost flush with the inner surface 46 of the outer wall. The cable can be bonded using a high temperature resin or brazed in place. The end of the cable 46 is coated with a transparent protective layer of silicon oxide, indicated by numeral 48. The inner surface 46 of the outer wall 30, as well as the inner surface 50 of the inner wall 32 are coated with optical substrate 51 such as Silicon Dioxide and Aluminum Oxide. The number of arrays may vary with size and design requirements of the individual turbojet engine 10.

The Fiber laser has as combined resonator and active medium component its Ytterbium-doped fiber optic core, which is light-pumped by laser diodes connected directly to the turbine driven electrical generator, which powers them. The laser beam focusing optics is fused directly onto the fiber core output ends, thus minimizing space and assembly weight. Furthermore, multiple fiber cables can be coupled together and light-pumped in unison, in this manner increasing the fiber laser power output. These fiber lasers generate high energy photon beams which interact with both air and fuel molecules, consequently imparting their kinetic energy and thereby augmenting thermal activity within the combustion section.

Preferably, the laser arrays 40A and 40B are powered by electric generator 60. A gearbox 62 coupled to the shaft 20 between the compressor section 14 and combustion section 16 drives shaft 64 mounted on the housing 12, which, in turn couples to gearbox 66 driving the generator 60.

In a second version of the turbojet engine, generally designated by numeral 10A, the combustion section, now indicated by numeral 16A, includes a plurality of cylinders 70 spaced about the longitudinal axis 11. Each cylinder 60 has a longitudinal axis 71 and includes a front end having air intake ports 72 and fuel inlet nozzle 74 coupled to fuel line 24. The opposite end of cylinder terminates in an exhaust nozzle 66 that directs exhaust gases to the turbine section 18. The laser arrays 80A and 80B couple to the cylinders 60 by means of fiber optic cables 82A and 82B. Again the laser impulses are directed slightly off the longitudinal axis 71 of the cylinders 70.

While the invention has been described with reference to a particular embodiment, it should be understood that the embodiments are merely illustrative as there are numerous variations and modifications, which may be made by those skilled in the art. Thus, the invention is to be construed as being limited only by the spirit and scope of the appended claims.

INDUSTRIAL APPLICABILITY

The invention has applicability to aircraft propulsion industry.

The invention claimed is:

1. A turbojet propulsion system having a longitudinal axis comprising;
   a compressor section:
   a turbine section coupled by a shaft to said compressor section;
   a combustion section mounted between said compressor section and said turbine section;
   an exhaust duct coupled to the aft end of said turbine section;
   a fuel delivery system for supplying fuel to said combustion section; and
   a laser assembly for providing electromagnetic radiation to said combustion section said laser assembly includes a plurality of lasers coupled to said combustion section both circumferentially and along the longitudinal axis.

2. The turbojet propulsion system as set forth in claim 1 comprising an electric generator coupled to said laser assembly for providing power thereto.

3. The turbojet propulsion system as set forth in claim 2 wherein said electric generator is coupled to said shaft and is powered thereby.

4. The turbojet propulsion system as set forth in claims 3 comprising:
   said combustion section in the shape of a hollow cylindrical ring having external and internal circumferential walls, the internal surfaces of said external and internal walls having laser beam reflecting surfaces;
   said shaft extending through said hollow cylindrical ring; and
   said lasers positioned on said external wall to direct laser beams to said internal surface of said internal wall, such that the laser beams from said lasers are reflected off said internal surface of said internal wall back toward said internal surface of said external wall.

5. The turbojet engine as set forth in claim 4 wherein said lasers are directed slightly of the longitudinal axis such that the laser beams reflected off said internal surface of said inner wall are not reflected directly back to the initiating laser of the beam.

6. The turbojet engine as set forth in claim 5 where in said internal surface of said inner wall and the internal surfaces of said external and internal walls are coated with optical substrates selected from the group consisting of Silicon Dioxide and Aluminum Oxide.

7. The turbojet propulsion system as set forth in claim 5 where lasers are positioned on said external surface of said cylinder, such that the laser beams to not pass through said longitudinal axis of said cylinders.

8. The turbojet propulsion system as set forth in claim 3 comprising:

said combustion section comprising a plurality of hollow cylinders formed into a ring, each having a centrally located longitudinal axis, the inner surface of said cylinders having a laser beam reflecting surface;

said shaft extending through the middle of said plurality of cylinders; and said lasers positioned on the external surfaces of each of said cylinders to direct laser beams into said cylinders such that the laser beams from said lasers are reflected off the inner surfaces of said cylinder.

9. The turbojet engine as set forth in claim 8 where in said internal surface of said hollow cylinders are coated with optical substrates selected from the group consisting of Silicon Dioxide and Aluminum Oxide.

* * * * *